C. M. HARDENBERGH, A. L. MINER & W. J. FENDER.
Middlings Purifiers.

No. 139,386. Patented May 27, 1873.

3 Sheets--Sheet 2.

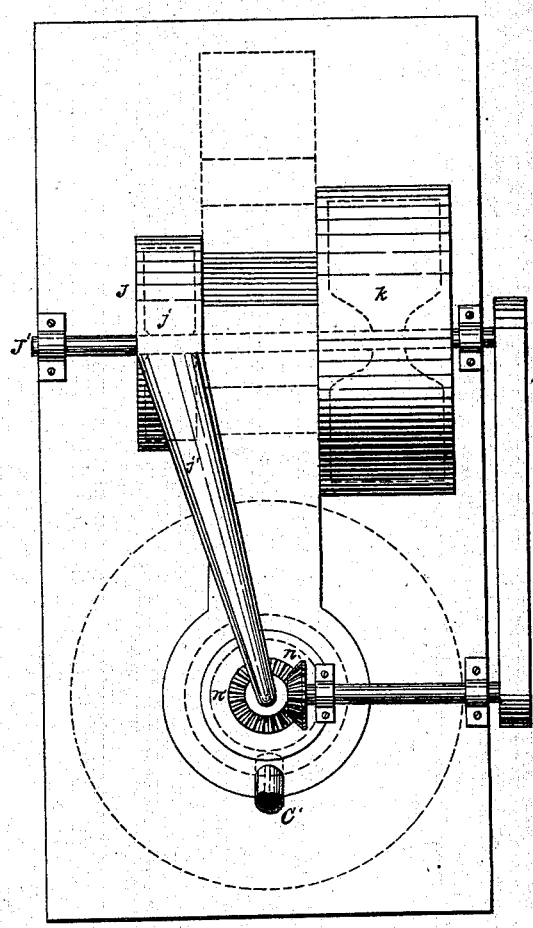

UNITED STATES PATENT OFFICE.

CHARLES M. HARDENBERGH, AMOS L. MINER, AND WILLIAM J. FENDER, OF MINNEAPOLIS, MINNESOTA.

IMPROVEMENT IN MIDDLINGS-PURIFIERS.

Specification forming part of Letters Patent No. 139,386, dated May 27, 1873; application filed May 10, 1873.

*To all whom it may concern:*

Be it known that we, CHARLES M. HARDENBERGH, AMOS L. MINER, and WILLIAM J. FENDER, of Minneapolis, in the county of Hennepin and State of Minnesota, have jointly made certain Improvements in Middlings-Purifiers, of which the following is a specification:

The object of our invention is to improve the method or process of purifying or separating the good and heavy middlings from the fine dust and linty substance that is always present with the middlings unless separated by a different process than by the ordinary method of simply bolting; and it consists of the special construction and arrangement of the parts that enter into the operation to produce the separation desired, as will be more fully hereinafter described.

Figure 1:
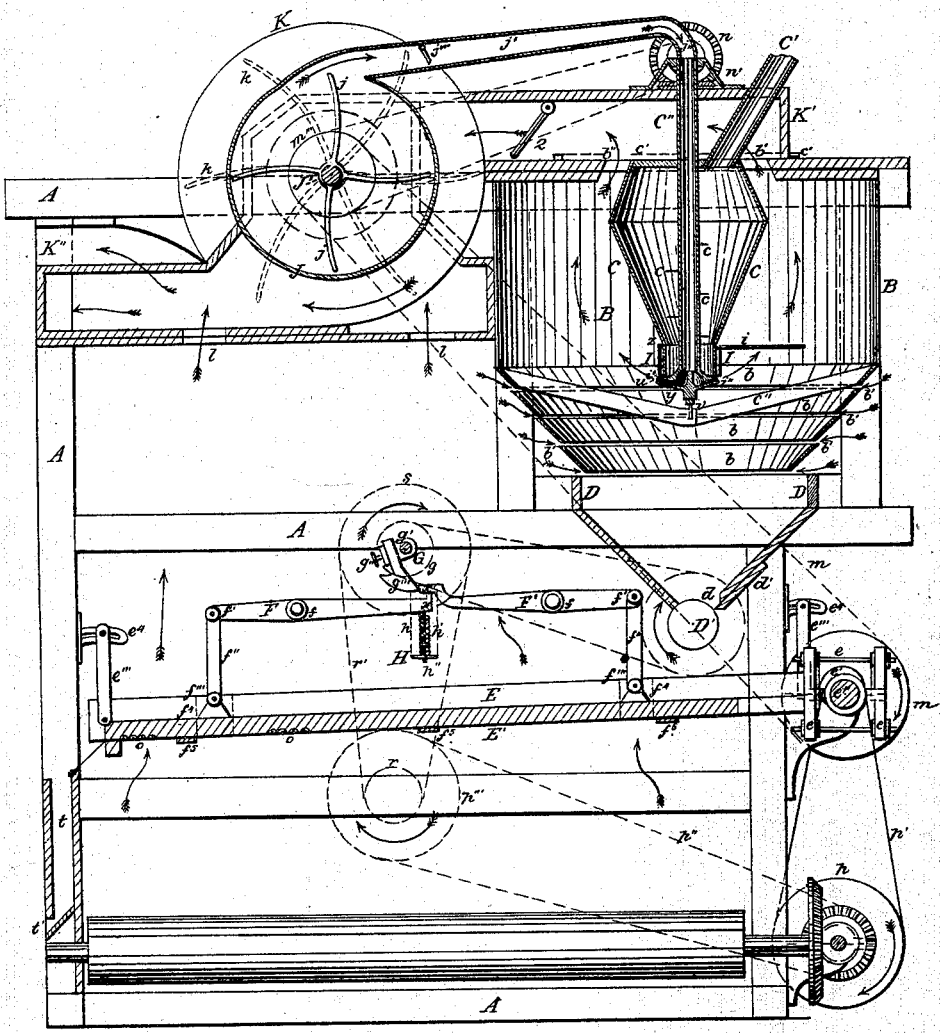
Figure 2:
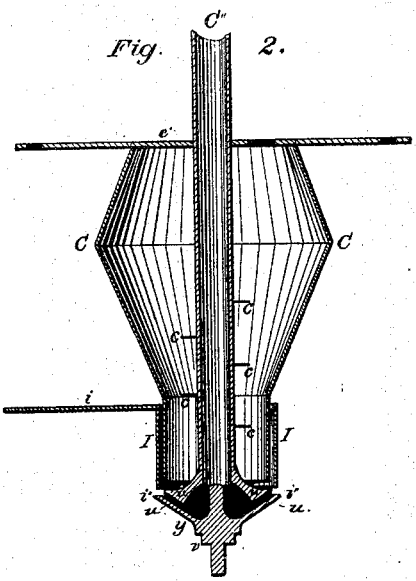
Figure 3:
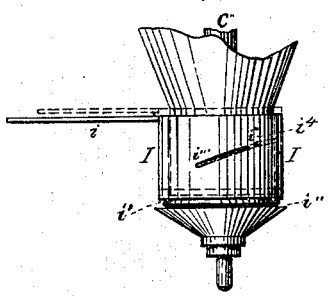
Figure 4:
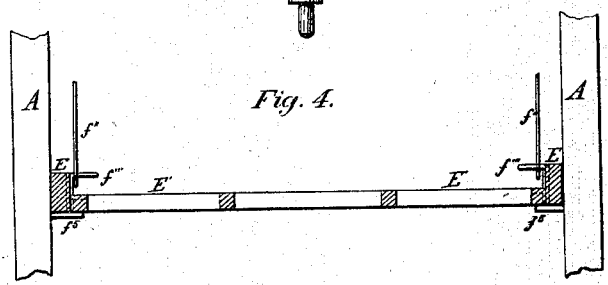

In the drawing, Figure 1 represents an upright sectional side view of the machine; Figs. 2, 3, and 4, enlarged details of some of the parts; and Fig. 5 a top view of the machine.

A represents the frame of the machine that supports all the operating parts. B is an upright air-chamber or cylinder, having a hopper or contracted bottom composed of a series of annular reverse conical rings $b$, the bottom of each ring is a little less diameter than the top of the next below it, so that a small open air space, $b'$, is left between each of the rings, as seen in Fig. 1. C is a receiving-hopper, smaller at its top end than at a distance below, and from the enlarged part it contracts to point $z$, from which point to the bottom the sides are parallel, and form a cylinder. $C'$ is the feed-tube that delivers the middlings into the hopper C. $C''$ is a revolving air-tube, made to revolve by the gear-wheels $n$ and $n'$, and has projecting from its sides the stirrers $c\,c\,c$, and has at its bottom end a trumpet-shaped or concave conical base $u$, as seen in Fig. 2; and underneath of, and of a little greater diameter, is a cap-formed air-chute, $y$, that is separated from $u$ to form the air space $i''$ between $u$ and $y$, and the air-chute $y$ forms at its bottom end the step-pin $v$, which has a bearing and box in the spider-arms $c'''$ that are fast to the lower end of air-chamber B, and supports the weight of the revolving air-tube $C''$, while the receiving-hopper C is sustained by a spider, $c'$, above the air-cylinder on frame A. D is a hopper that receives the heavy and pure middlings and delivers it evenly onto the reciprocating-bolt by the revolving feed-roller $D'$, through the opening $d$, which can be adjusted to be greater or less by the sliding-valve $d'$. E is a horizontal reciprocating frame within the frame A, and is suspended by swinging arms $e'''$ on brackets $e^4$, and reciprocated by an eccentric, $e'$, fast on revolving-shaft $e''$ working in frame $e$. $E'$ is the bolt-cloth frame, having the cloth $o$ fast to the under side thereof; reciprocates with frame E by its being within it, and has an independent perpendicular movement from frame E. G is a revolving transverse horizontal shaft, on which are fixed projecting arms $g'$ to receive adjustable projecting cams $g'''$, which can be held to project more or less from the shaft G by the holding-screws $g''$. F and $F'$ are horizontal levers pivoted at $f$ to the frame A, and to upright arms $f''$ at $f'$, while the meeting end of lever F is turned up at $x$, and the meeting or inner end $x'$ of $F'$ is turned upward and horizontally over the end $x$ of lever F and resting upon upright $x$ of lever F; upright arms $f''$ are pivoted at $f'''$ to upright slide-boxes that are attached to frame $E'$ at $f^4$. H is an inwardly-projecting lug on an upright adjustable plate, $h$, so that it can be adjusted to be higher or lower; $h'$ is a spiral spring coiled around an upright rod, $h''$, the upper end of which bears on the under side of lever F at its inner end, and its lower end upon the upper side of lug H.

By the revolution of the cams $g'''$, on shaft G, the outwardly-projecting circular end will strike against the horizontal raised end $x'$ of lever $F'$, which rests upon the upright end $x$ of lever F, and forces them down; and as the levers F and $F'$ are firmly pivoted at $f$ to the frame A the bolt-cloth frame $E'$ will be raised upward until the cams $g'''$ revolve so as to pass off of the end $x'$ of lever F, when the spring, which was contracted while the cams $g'''$ were bearing upon the ends of lever $F'$, will suddenly throw the inner ends of the levers up, and the frame E' will fall as suddenly and strike upon the upper sides of the plates $f^5$ that are fast to the under side of reciprocating frame E, which causes a sudden jar of the bolt-cloth frame E' sufficient to detach any fine particles of flour or middlings that may be attached to the bolt-cloth, and thus keep the cloth clear.

I is a sliding and partially-revolving feed-sleeve that surrounds and turns upon the cylinder at the lower end of receiving-hopper C. $i^4$ is a guide-pin fast on the cylinder at the lower end of hopper C, and enters into an inclined slot, $i'''$, in sleeve I; and by turning sleeve I by the lever-handle $i$, which is firmly attached thereto, the sleeve will be either raised or lowered in accordance with the direction the handle $i$ is moved, and so as to regulate the feed of the middlings into the air-cylinder by making the space $i'$ between the lower edge of the sleeve I and the upper side of the conical base $u$ of the revolving air-tube $C''$. J is a fan-case, containing a revolving fan, $j$, on transverse shaft $J'$, and by the revolution of the fans $j$ air is taken into case J and forced through air-pipe $j'$ into the revolving air-tube $C''$ at the curved part $j''$; thence through the revolving air-tube $C''$ into the revolving cup $u$, whence it is delivered in all directions into air-chamber B, as seen by the arrows in Fig. 1. $j'''$ is a valve to regulate the amount of air forced through tube $j'$ from fan $j$. K is an exhaust fan-case, inclosing an exhaust-fan, $k$, and is revolved by shaft $J'$ the same as fan $j$; is much larger in diameter; and by revolving with the same speed with the fan $j$, has the power to exhaust more air than is supplied by fan $j$ through the revolving tube $C''$ into hopper C, as the gathering-boards under the bolt have air spaces between them, and the air spaces $b'$, between the conical and inclined rings $b$ of the air-chamber B, air is furnished to supply the exhaust-fan $k$, and is so exhausted from the air-chamber B up through openings $b''\ b''$ into air-tube or case K', and up through the bolt-cloth through openings $l\ l$ into the same air-case K'; thence out through the exit opening $K''$ back to the fan, as seen by arrows in Fig. 1. 2 is a valve in the air-case K', to regulate the force of the current of air to pass through the air-case K'. The air-openings $l\ l$ are regulated by slides, so as to allow the proper current of air to pass upward from the bolt, and so that none of the good flour or middlings will be sucked up through the openings $l$ into the air exhaust-case K', as the force of the current of passing air is always to be so regulated that none of the heavy middlings or fine flour will be exhausted and forced from the machine with the air.

The several operating parts of the machine are put in motion by common means, such as pulleys, belts, and gear-wheels, that it is not necessary to describe here, as they can be seen in Fig. 1 of the drawing.

*Operation.*

The middlings are fed into hopper C through feed-tube C', when, by the action of the revolving stirrers $c$ on tube $C''$ they fall to the bottom of the tube upon the cone $u$, which tends to force the middlings outward underneath the sleeve I, and above the cone $u$ at opening $i'$, which can be enlarged or contracted, as may be desired, to admit the desired quantity, and as it leaves the cone at the opening $i'$ comes in contact with a current of air forced through air-tube $C''$ into the cup $y$, where it leaves the cup in an upward direction, strikes the outgoing middlings, and causing them to be scattered in every direction by the simple force of the air that is forced through tube $C''$; and while in this scattered and flying condition in the air-cylinder B the current of air brought in by the action of the exhaust-fan $k$ carries up through the openings $b''$ above the air-cylinder into air-case K', thence out through exit-opening $K''$; all the light and impure particles that are with the middlings, and when the heavy middlings are thus treated, fall down by the gathering-rings into the hopper D, and are distributed by the feed-roller D' evenly upon the bolt-cloth $o$ in bolt-frame E', which has a horizontal reciprocating and perpendicular jarring motion; and as they are thus being treated by the action of the bolt a second current of air is passing through the bolt and middlings, still further clearing them of any impurities not previously taken out by the first action of the air in chamber B by the light stuff passing up and out into air-case K' and finally out of the machine while any stuff so heavy that it will not float off with the air-current, or so coarse that it will not pass through the bolt-cloth, will be thrown off of the bolt at the tail end into passage $t$, and out of the machine at chute $t'$, thus separating the middlings from any foreign fine-ground and light stuff at a single operation, or once passing through a machine.

Having thus fully described our invention, what we claim and desire to secure by Letters Patent, is—

1. In a middlings-purifier, the air-cylinder B, having the hopper-shaped bottom, composed of annular reverse conical rings $b$, having air spaces $b'$ between them, in the manner substantially as and for the purposes described.

2. The revolving air-tube $C''$, having stirrers $c\ c\ c$, and conical base $u$, in combination with the receiving-hopper C, having the cylindrical base surrounded by a feed-sleeve, I, to regulate the amount of middlings fed into the machine, substantially as and for the purposes described.

3. The receiving-hopper C, having the cylindrical base and feed-sleeve I, and the air-tube $C''$ revolving therein when suspended within the exhaust-cylinder B, in the manner substantially as and for the purpose described.

4. In a middlings-purifier, the frame E having a horizontal, or nearly horizontal, reciprocating movement, and the bolt-cloth frame E within and reciprocating therewith, and having a perpendicular jarring movement independent from frame E, substantially as and for the purpose described.

5. The combination of the revolving-cams $g'''$, pivoted levers F and F', adjustable lugs H, and springs $h'$, with the bolt-cloth frame E' and jar-plates $f^5$, in the manner substantially as and for the purpose described.

6. In a middlings-purifier, the arrangement of an air-forcing fan, $j$, a revolving air-tube, C'', a receiving-hopper, C, within an air-cylinder, B, having a hopper-shaped bottom of annular angular rings with air spaces between them, the bolt-cloth frame E', having a reciprocating and a sudden vertical rising and falling motion, with an exhaust fan, $k$, constructed to operate in the manner substantially as herein described.

7. In a middlings-purifier, the air-forcing fan $j$ and the exhaust-fan $k$, when arranged upon the same shaft J', in the manner and for the purpose substantially as described.

CHARLES M. HARDENBERGH.
  A. L. MINER.
  WILLIAM J. FENDER.

Witnesses:
 R. R. BRYANT,
 JOHN QUIGLEY.